May 9, 1961 T. O. HENRIKSON 2,983,232
CARGO BRACES
Filed Dec. 15, 1959 5 Sheets-Sheet 1

INVENTOR
THOR O. HENRIKSON

BY *Ralph L. Barrett*
ATTORNEY

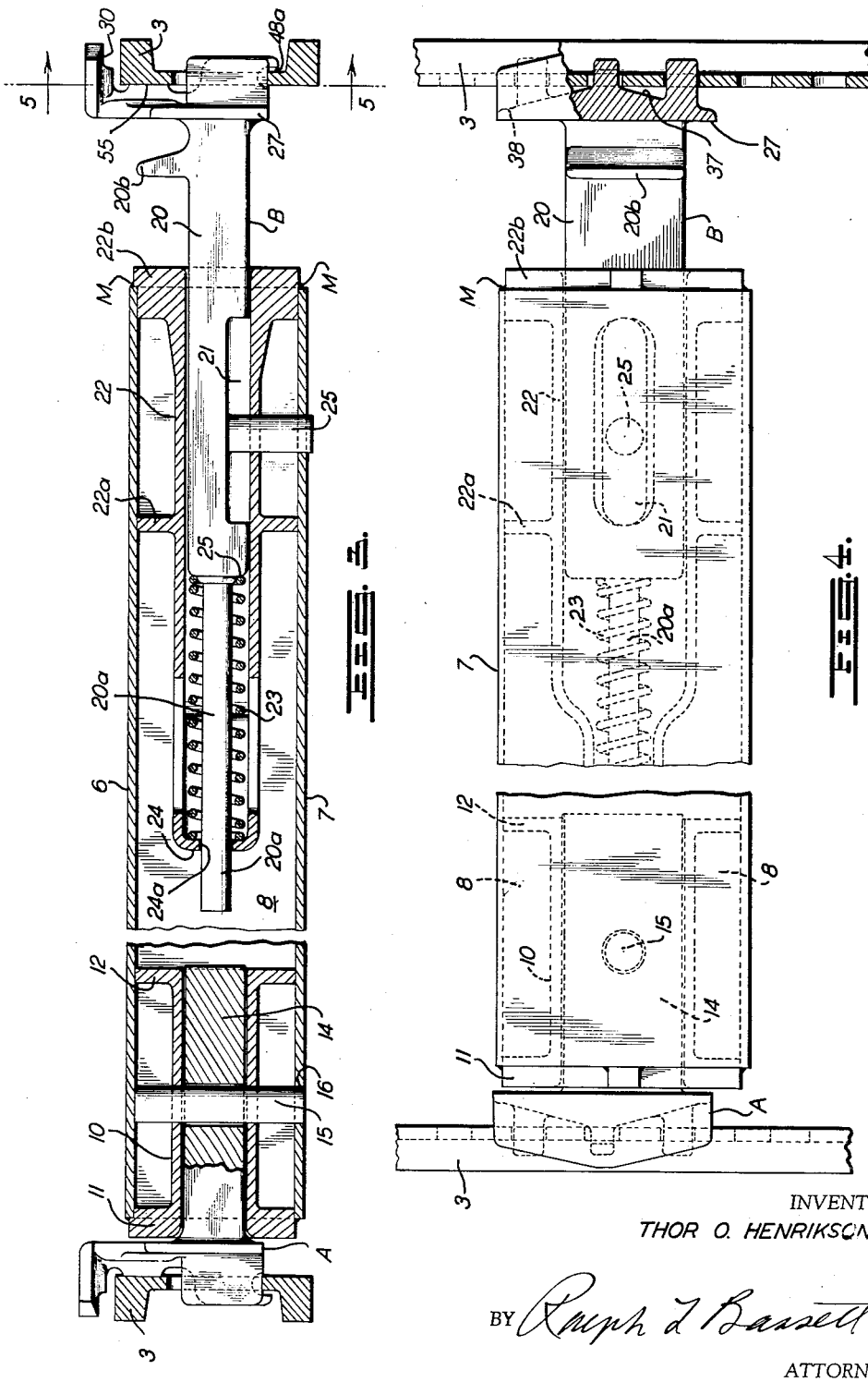

May 9, 1961  T. O. HENRIKSON  2,983,232
CARGO BRACES
Filed Dec. 15, 1959  5 Sheets-Sheet 4
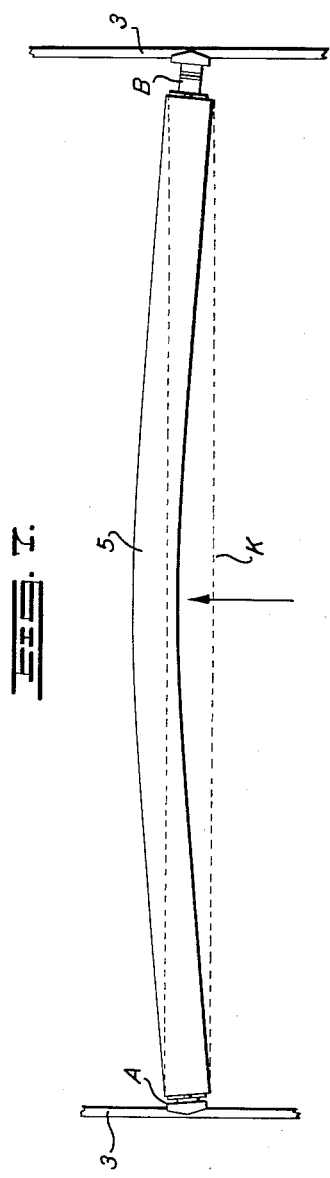
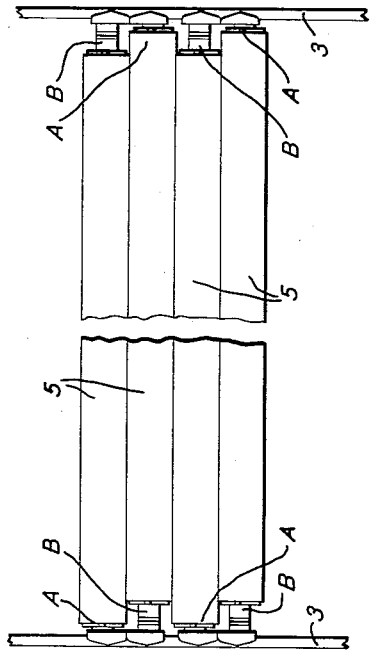
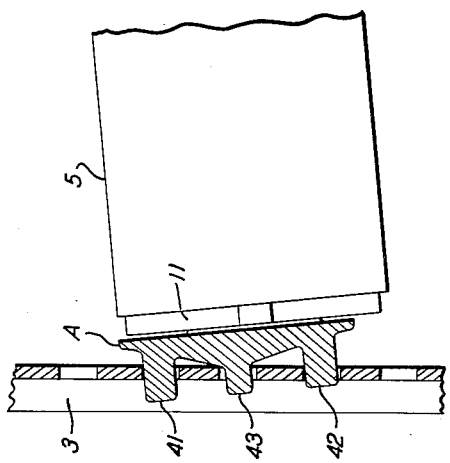
INVENTOR
THOR O. HENRIKSON
BY *Ralph T. Barrett*
ATTORNEY

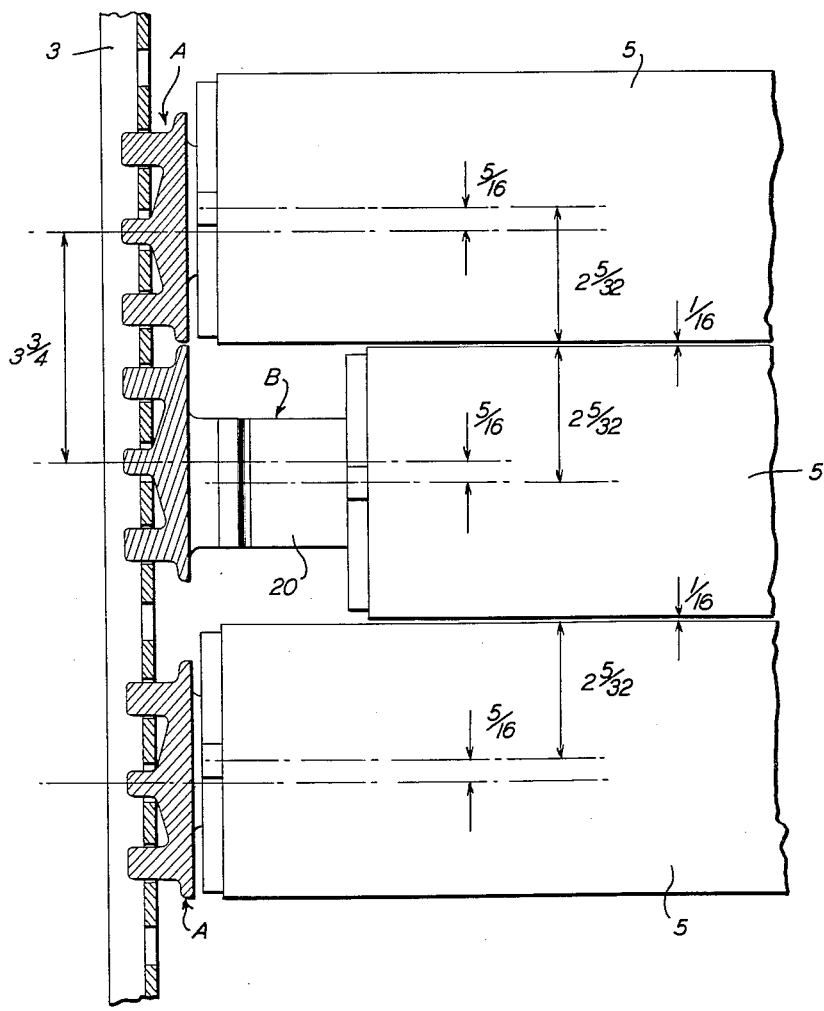

United States Patent Office 2,983,232
Patented May 9, 1961

2,983,232

CARGO BRACES

Thor O. Henrikson, Seattle, Wash., assignor to Pacific Car and Foundry Company, Renton, Wash.

Filed Dec. 15, 1959, Ser. No. 859,740

10 Claims. (Cl. 105—369)

This invention relates to improvements in cargo braces and particularly in cargo braces for the lading compartments of railway cars and other carriers.

One of the objects of this invention is the provision of an all metal cargo brace which is provided with belt rail connecting members at each end, the connections being such that the parts interengaging with the belt rails will not cause injury or rupture of the latter when the beam is heavily loaded horizontally.

A further object of the present invention is the provision of a head for a lading beam for use with recessed belt rails, the head including a spaced pair of supporting lugs and intermediate hook, the parts being proportioned to provide necessary clearance for movement of the head under loading.

A further object of the present invention is the provision of a head for a lading beam for use with recessed belt rails, the head including a spaced pair of supporting lugs and intermediate hook, the parts being proportioned to provide necessary clearance for movement of the head under loading, and in addition fulcrum means being provided to permit appropriate rotational movement of the head when the beam is deflected due to loading. The head further including a projecting support positioned above the hook, lugs and fulcrum to support the beam when the lugs and hook are retracted but being out of engagement with the top of the rail when the beam is supported by the lugs.

Another object of the invention is the provision of a lading beam or cross member having a fixed head at one end for connection with an associated belt rail and a sliding head at the other end for connection with an associated belt rail, the lading beam being formed of an extrusion and being of greater width than height to provide strength in the direction of horizontal forces.

Another object of the invention is the provision of a belt rail for use with a lading beam, the belt rail including an upper guide surface and a web portion which is perforated or recessed at regular intervals throughout its length, the recesses or perforations being formed by a punching operation including the punching of a series of alternate holes followed by the punching of the alternate intermediate holes of the first-punched series, whereby the present typ of head with its spaced supporting lugs are always engaged in holes from the same group of punches, with the hook in one slot from the next punching operation.

These and other objects of the present invention will more clearly hereinafter appear by reference to the accompanying drawings forming a part of the instant specification, wherein like characters of reference designate corresponding parts throughout the several views, in which:

Fig. 3 is a side elevation partly in section showing a lading beam associated with belt rails;

Fig. 4 is a top plan view with one of the lading heads shown partly in section;

Fig. 7 is a top plan view of a lading beam showing the beam in deflected position under load;

Fig. 8 is an enlarged top plan view of one end of a beam;

Fig. 9 is a top plan view showing a stack of beams associated with a belt rail; and Fig. 10 is an enlarged view of one end of a stack of beams showing the arrangement of the associated parts.

Figure 1:
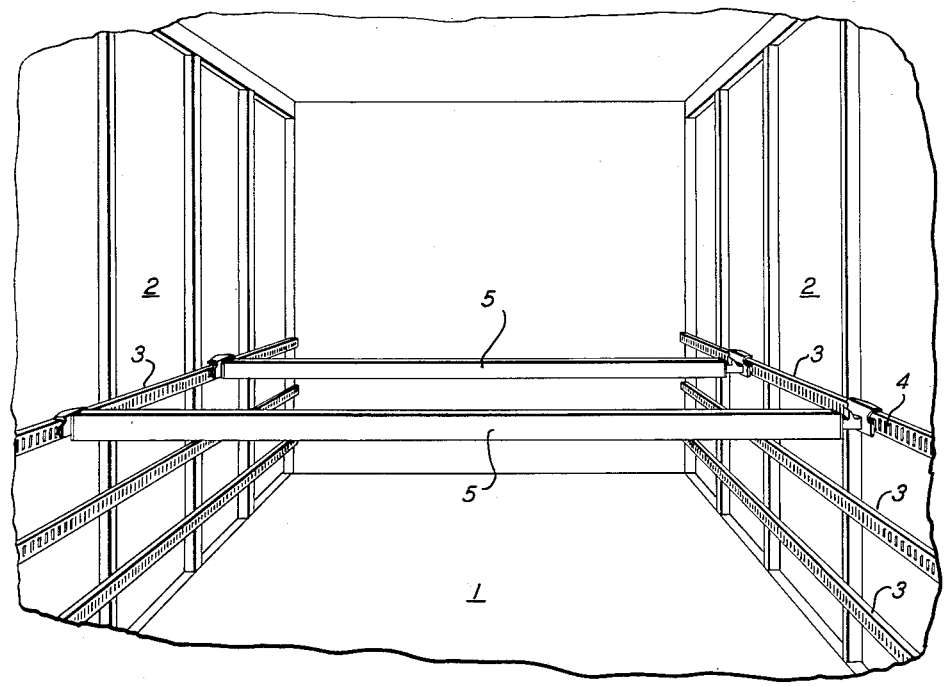
Fig. 1 is a front elevation of a section of a lading body provided with lading beams and belt rails in accordance with the present invention.

In Fig. 1 there is illustrated a portion of a lading chamber of a carrier, such as a railway car, this lading chamber including the bottom 1 and sidewalls 2, the latter being provided with longitudinally extending horizontal supporting rails or belt rails 3 formed with suitably spaced perforations 4 on their vertical faces, the perforations 4 being shown as elongated vertically and evenly spaced. The perforations 4 in the belt rails 3 are each of generally uniform dimension and equally spaced in order that the associated parts may more fully cooperate, as will be hereinafter more fully described. Any number of belt rails 3 may be provided, the rails being longitudinally arranged in the same horizontal plane as shown.

Lading beams 5 are shown in position on belt rails 3 in Fig. 1, these lading beams being more fully illustrated in Figs. 3 and 4, and being generally of rectangular form with the greater width of the beam lying fore and aft in order to accommodate the buff and draft forces occurring when in use. The lading beam 5 includes the top wall 6, bottom wall 7 and sidewalls 8 and are formed of tubular aluminum extrusions. Tubular aluminum beams or cross members have a much higher load carrying capacity per pound of weight than conventional wood and steel composite structures and, therefore, require less maintenance of equipment per car. It being understood that members formed or extruded from other light weight high strength materials are not excluded as a part of this specification.

The tubular extruded aluminum lading beam illustrated is provided with a pair of head members which are equipped with projecting lugs and hooks for inter-engagement with the recesses in the belt rails 3. Generally one of the head members is rigidly associated with the beam, as at A, while the opposite head member is slidably associated with the opposite end of the beam, as at B. The fixed head A is carried in a tubular frame 10 having end flared flanges 11 and 12 of such dimension and so constructed and arranged as to seat within and engage the inner four wall faces of the lading beam. Within the tubular frame 10 the shank 14 of the fixed head A extends and is secured in position by a pin 15 which extends through a perforation 16 in one of the walls of the lading beam. The head structure A, except for the fixed mounting in the end of the beam, is similar to the head structure B, which latter as above stated is slidably mounted in the opposite end of the beam.

The sliding head B includes a shank 20 having enlarged slot 21 in one wall which is received in the hollow filler block 22 and operates against the spring 23 located between the inturned end wall portion 24 of the filler block and the reducing shoulder 25 of the shank. The reducing shoulder 25 of shank 20 defines an elongated spring guide 20$^a$ which extends through the spring 23 and the opening 24$^a$ at the inner end of the hollow filler block. The filler block is provided with spaced flanges 22$^a$ and 22$^b$ which fit within the extruded beam to center and hold the same. The flange 22$^a$ is normally positioned well within the beam extrusion while the flange 22ᵇ is shown as partly extending beyond the end of the beam to facilitate welding as at M. The shank 20 is positioned generally centrally of the beam structure, as will be more clearly seen from the end view of Fig. 6.

Figure 6:
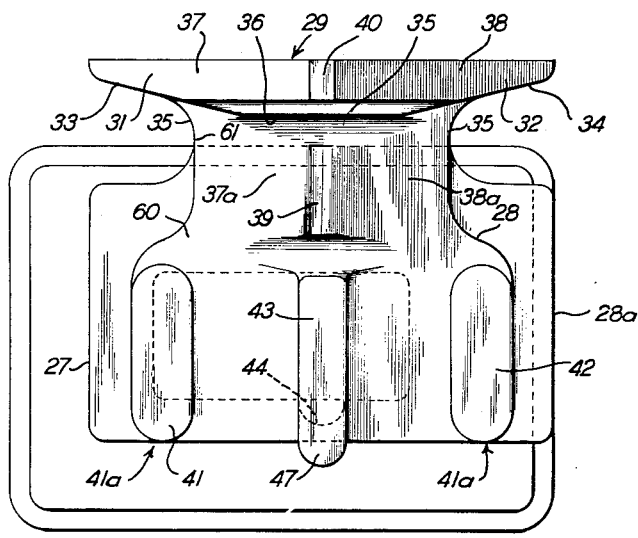
Fig. 6 is an end elevation of one end of a beam head.

Fixed to the outer end of the shank 20 of sliding head assembly B is an upright plate 27, this plate 27 being offset laterally and upwardly of the axis of the shank 20 and being generally rectangular in form with its transverse dimension such that one lateral side edge 28ᵃ is flush with the adjacent beam side face, see Fig. 6. The upper edge of the plate 27 which is located above the top of the beam is formed with a centrally located horizontal forwardly extending projection 29 terminating in a beam supporting extension 30 which extends substantially outwardly beyond the plate 27, its lugs and hook, for engaging the top of a belt rail when the lugs and hook are disengaged therefrom as will be hereinafter described. Normally when the beam is supported on its lugs in the recesses of the rails, the extension is above and out of engagement with the rail.

The horizontal projection 29 includes laterally extending wings 31 and 32 defined by outwardly and upwardly inclined bottom surfaces 33 and 34, the inner ends of which merge into the restricted neck portion 35 of upright plate 27. The inclined bottom surfaces 33 and 34 partially define the supporting extension 29 with a reinforced central area which is medially flattened as at 36 and recessed at its outer transverse edge to provide the belt rail engaging portion 30, as best shown in Fig. 3. It will be further seen by an examination of Fig. 6 that the outer face structure of the supporting extension 29 is defined by forwardly converging upright walls 37 and 38 and a medial connecting area 40.

Figure 5:
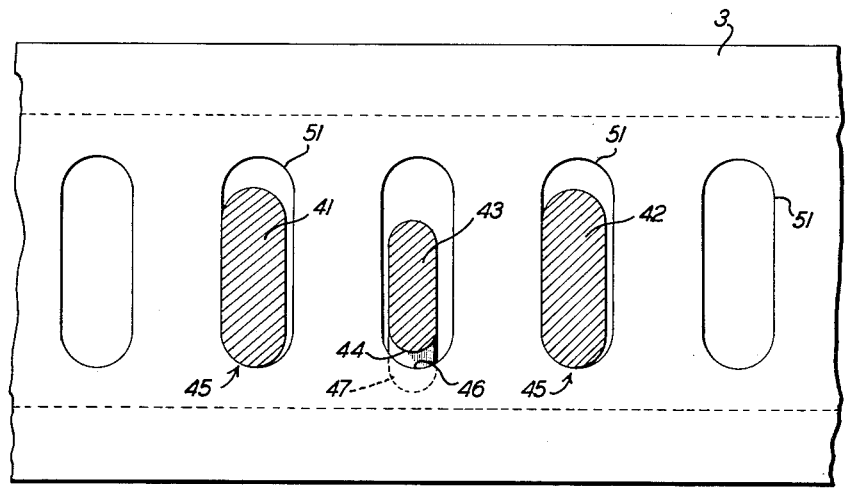
Fig. 5 is a fragmentary elevation showing the lugs and intermediate hook in position in their recesses.

At the lower front portion of the plate 27, below the horizontal projection 29, there are formed a pair of spaced supporting lugs 41 and 42 and an intermediate hook member 43, all of which are adapted to be inserted into three of a horizontal array of spaced openings or apertures 4 of an associated belt rail. As shown in Figs. 5 and 6, the supporting lugs 41 and 42 are relatively heavy and generally vertically elongated and are adapted to form the support for the beam while the medial hook 43 has a shank portion of considerably less diameter with its bottom surface 44 formed substantially above the bottom surfaces 41ᵃ of the supporting lugs 41 and 42, so that when the latter are engaging the bottom surfaces 45 of the recesses, the bottom surface 44 of the hook is out of engagement with the adjacent wall defining the medial recess as at 46. The nose 47 of the hook 43, however, depends substantially below the lower faces 41ᵃ of the lugs 41 and 42 (see Fig. 6) so that when the lugs and hook are in engagement with their respective recesses, the head cannot be withdrawn therefrom without lifting the head to thereby disengage the hook nose 47. In this connection it is essential that the openings or recesses 4 in the guide rails be of greater vertical dimension than the total height of the lugs and hook shank. Thus, when the lugs and hook are in position within the openings or recesses 4 of a guide rail, the head can be elevated to disengage the nose 47 of the hook and the lugs and hook retracted with the head against the tension of spring 23 by engaging the transverse handle member 20ᵇ positioned immediately back of the vertical plate 27 and at the top of the shank, whereupon the beam may be supported on the guide rail by the beam supporting extensions 30. In Fig. 3 it will be noted that the inner wall of the hook nose 47 is normally spaced from the adjacent face of the rail, as at 48ᵃ.

As an illustration, the recesses in the belt rails may have a transverse dimension of ⁹⁄₁₆", and in this case the loading lugs would have a transverse dimension of ½" with the hook, which is not intended to carry any load, allowed a transverse clearance approximately ³⁄₁₆". When the load carrying lugs 41 and 42 are resting in the bottom of their respective recess, the central hook projection 47 could extend, for instance, ⁵⁄₁₆" below the slot in which the hook was located with approximately ¼" clearance below the hook shank. With which dimensions, when the beam member is lifted the load lugs would contact the upper part of the slot and the tip of the safety hook would be at least ¹⁄₁₆" above the bottom of the slot and the head could be readily withdrawn.

Figure 2:
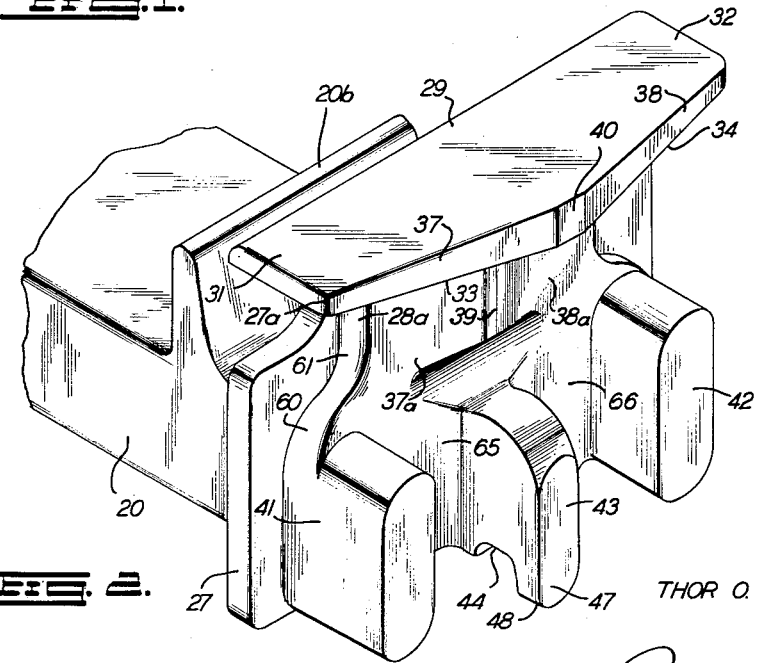
Fig. 2 is a perspective view of one of the heads.

Angular faces or forwardly converging walls 37ᵃ and 38ᵃ are shown in Figs. 2 and 6. These faces 37ᵃ and 38ᵃ are sloping away from a fulcrum area 39 to provide ample clearance for angular displacement of the head rotational movement on its fulcrum area 39. The angular displacement is essential when the beam member is loaded, as shown in Fig. 7, it being evident that the end structure will follow the main beam structure so that the head structure is no longer at 90° to the belt rail. It is to permit this angular displacement that the fulcrum and receding wall areas are provided.

By use of the spaced supporting lugs and the intermediate hook, and the relative position and arrangement of these parts, it is found that greater flexiblity in handling the beam member in positioning and withdrawing the head is accomplished, and that the beam under load has clearances which prevent injury to the belt rails.

The belt rails 3, which are arranged in the car in opposite pairs, in accordance with requirements and specifications, are manufactured with the holes formed alternately at the same time. For instance, the punch may first form a plurality of alternate holes at one time; then the punch or work is adjusted and another alternate series of holes punched. By this means the central loading lugs 41 and 42 are always engaged in holes from the same gang of punches, but the safety hook is in one slot from the next punch operation. This holds true no matter which two holes are engaged for the load lugs or hooks. As a result, the load lugs are always located in accurately spaced holes, whereas the third hole may be off to some degree due to wear or human error.

Referring now to Fig. 9, it will be seen that a series of beams are arranged in abutting relation in order to build up a combined capacity to hold heavy loads. This is particularly true in shipping heavy packages or coils of tin plate.

Under horizontal loading, a lading beam may be subjected to a load of several thousand pounds which will result in a lateral deflection of a beam as much as three inches at its central area and such loading and deflection would result in the lugs, if snugly engaging in their openings or recesses, distorting and destroying the belt rail. To avoid this condition, the lugs 41 and 42 are not only made of less vertical height to permit disengagement of the nose 47, but are of less width than the openings or recesses 4 in the belt rail with which they are associated. In addition, the transverse dimension of the hook 43 is substantially less than the transverse dimension or width of the lugs so that the hook during deflection of the beam does not engage the wall of the opening or recess in which it is located. As a further feature of this invention, the rotational movement of the head as a result of the deflection of the associated beam is provided for by the formation of the fulcrum 39 centrally of the head and immediately above the hook 43, as best shown in Fig. 2. The fulcrum 39 is defined by the receding lateral walls 37ᵃ and 38ᵃ which provide clearance between the belt rail face 55 and head during engagement. The portion of the plate below the supporting projection 29 and between the lugs 41 and 42, as well as the area of the fulcrum support, is thickened as at 60 to give strength and stability to the structure. The reinforced area 60 is restricted as at 61 at the neck of the plate to conform to the plate shape at this area and to provide for the insertion of an operating bar.

At times it is necessary to lay cross beams side-by-side to build up a high capacity to hold heavy loads. Heretofore in the prior art the size of the beam members and the hole spacing in the belt rails were such that when the members were laid side-by-side all the rigid heads were at one side and all movable heads at the other side. Obviously some clearance must be provided between the movable head shank and its pocket. Normally when these members are laid side-by-side, this slack at the pocket and shank becomes accumulative and all at the same side. This slack places great stress on the head structures, as well as on the belt rails and the car structure, when the members are under heavy impact loads. With the present arrangement it is possible to alternate the head pattern and eliminate this slack, as shown in Figs. 9 and 10. The introduction of rigid heads on both sides cancels out the built-in clearance in the movable head structure. In the present disclosure and to accomplish the desired result, the width of the cross member can, for instance, be 4 5/16" with the amount of the off center at 5/16" and the belt rail hole spacing 1 1/4".

Fig. 7 shows a cargo brace 5 associated with the belt rails 3, this cargo brace being under heavy load and deflected from the normal dotted line position K to the full line position. This deflection may be as much as three inches at the center of the beam and when the beam is so deflected the position of the head will be as shown in Fig. 8. In this Fig. 8 the hook is shown out of contact with the lateral walls of the recess in the belt rail, while the position of the supporting lugs have been altered, as indicated, from its normal 90° angle to the belt rail. In the prior art the structures may have a moment of twisting action at their point of attachment. The present design cannot impose such a moment and cause damage to the belt rail when the cross member is under extreme deflection due largely to the cutting away of the upper flange and the faces 37a and 38a of the head at an angle to provide for displacement.

In Fig. 9 there is illustrated a stack of beams associated for accommodating a heavy load and in this disclosure it will be noted that the fixed heads A alternate with sliding heads B.

Fig. 10 is an enlarged view showing the alternate arrangement of the fixed and slidable heads, together with the appropriate dimensions with respect to the parts, including the recesses in the belt rail.

What I claim is:

1. In a cargo brace assembly for the merchandising chamber of a carrier, a combination comprising rail members fixed to and along the opposite side walls of the carrier in the same horizontal plane and formed with spaced longitudinally arranged recesses, the wall portions defining the bottom portions of the recesses lying generally in the same plane, the cargo brace including a medial beam structure having a longitudinally extending recess at one end, a fixed head at one end of the beam structure formed with a hook for engaging a recess in a rail member at one side of the chamber, a slidable head member at the other end of the beam structure including a shank slidably received in said recess within the beam structure, said slidable head including an upright outer end wall, a pair of spaced beam supporting lugs extending outwardly of said end wall, said supporting lugs being positioned to be received in spaced pairs of recesses in an oppositely positioned rail member at the other side of said chamber, said lugs having their bottom portions in the same horizontal plane to maintain said beam in said plane a rigid hook member fixed to and projecting from the outer face of said end wall, said hook being positioned between said lugs for reception within the recess in said rail member intermediate the recesses occupied by said spaced lugs and having a shank portion and a depending terminal hook at its extremity depending downwardly below the bottoms of said supporting lugs to normally prevent longitudinal displacement of said head from its associated rail, and a projection extending from said outer end wall forming a fulcrum to permit said head to rock thereon under load, said projection being positioned above said hook member and intermediate said spaced lugs.

2. In a cargo brace assembly for the merchandising chamber of a carrier, a combination comprising rail members fixed along the opposite side walls of the carrier in a generally horizontal plane and formed with spaced longitudinally arranged recesses, the wall portions defining the bottom portions of the recesses lying generally in the same plane, the cargo brace including a medial beam structure having a longitudinally extending recess at one end, a fixed head at one end of the beam structure formed with a hook for engaging a recess in a rail member at one side of the chamber, a slidable head member at the other end of the beam structure including a shank slidably received in said recess within the beam structure, said slidable head including an upright outer end wall, a pair of spaced beam supporting lugs extending outwardly of said end wall, said supporting lugs being positioned to be received in spaced pairs of recesses in an oppositely positioned rail member at the other side of said chamber, said lugs having their bottom portions in the same horizontal plane to maintain said beam in said plane, a rigid hook member formed integral with and projecting outwardly from said end wall, said hook being smaller in lateral dimension than said supporting lugs and being positioned between said lugs for reception within the recess in said rail member intermediate the recesses occupied by said spaced lugs and having a shank portion and a depending terminal hook at its extremity depending downwardly below the bottoms of said supporting lugs to normally prevent longitudinal displacement of said head from its associated rail, and a projection extending from said outer end wall forming a fulcrum to permit said head to rock thereon under load, said projection being positioned above and intermediate said supporting lugs.

3. In a cargo brace assembly for the merchandising chamber of a carrier, a combination comprising rail members fixed along the opposite side walls of the carrier in a generally horizontal plane and formed with spaced longitudinally arranged recesses, the wall portions defining the bottom portions of the recesses lying generally in the same plane, the carbo brace including a medial beam structure having a longitudinally extending recess at one end, a fixed head member at one end of the beam structure formed with a hook for engaging a recess in a rail member at one side of the chamber, a slidable head member at the other end of the beam structure including a shank slidably received in said recess within the beam structure, said slidable head including an upright outer end wall, a pair of spaced beam supporting lugs extending outwardly of said end wall, said lugs being positioned to be received in spaced pairs of recesses in an oppositely positioned rail member at the other side of said chamber, said lugs having their bottom portions in the same horizontal plane to maintain said beam in said plane, a rigid hook member secured to and projecting from the outer face of said end wall, said hook being positioned between said lugs for reception within the recess in said rail member intermediate the recesses occupied by said spaced lugs and including a hook shank and a depending terminal hook at its extremity depending downwardly below the bottoms of said supporting lugs to normally prevent longitudinal displacement of said head from its associated rail, a support member projecting from said end wall, said support member being positioned above said lugs and hook and extending transversely of the head and laterally and longitudinally beyond the lugs and hook for supporting the beam on its rail when the hook is disengaged therefrom, and a vertical projection on said outer end wall above said hook member and generally medial of said lugs forming a fulcrum for rocking movement of said head under load.

4. In a cargo brace assembly for the merchandising chamber of a carrier, a combination comprising rail members fixed along the opposite side walls of the carrier in a generally horizontal plane and formed with spaced longitudinally arranged recesses, the wall portions defining the bottom portions of the recesses lying generally in the same plane, the cargo brace including a medial beam structure having a longitudinally extending recess at one end, a fixed head at one end of the beam structure formed with a central hook and a pair of supporting lugs at each side of the hook for engaging recesses in a rail member at one side of the container, a slidable head at the other end of the beam structure including a shank slidably received in said recess within the beam structure, said slidable head including an upright end wall, a pair of spaced beam supporting lugs extending outwardly of said end wall, said lugs being positioned to be received in spaced pairs of recesses in an oppositely positioned rail member at the other side of the chamber, said lugs having a bottom portion in the same general horizontal plane to retain said beam in said plane, a hook member of less horizontal thickness than said lugs projecting from said end wall positioned centrally of said supporting lugs, said hook member being positioned between said lugs for reception within the recess in said rail member intermediate the recesses occupied by said spaced lugs, said hook member including a shank portion, the bottom of said shank portion being above the bottoms of said lugs, a hook at the outer end of the shank portion depending below the bottoms of said supporting lugs for engaging a wall of the belt rail adjacent the recess in which the hook extends for preventing the longitudinal displacement of the head from its associated rail, said upright end wall being formed with a centrally located extension above the hook member to define a fulcrum about which said head can swing in a substantially horizontal plane during deflection of the beam under load conditions.

5. In a cargo brace assembly for the merchandising chamber of a carrier, a combination comprising rail members fixed along the opposite side walls of a carrier in a general horizontal plane and formed with equally spaced longitudinally arranged recesses, the wall portions forming the bottoms of the recesses lying generally in the same plane, the cargo brace including a medial beam structure having a centrally positioned longitudinally extending recess at one end, a head at one end of the beam structure formed with a hook for engaging a recess in a rail member at one side of the chamber, a slidable head member at the other end of the beam structure including a shank slidably received in said recess within the beam structure, said slidable head including an upright end wall, said end wall being offset with respect to said shank and offset with respect to a vertical plane through the center of the beam, said plate having its outer margin flush with the adjacent side of said beam, a pair of spaced beam supporting lugs extending outwardly of said end wall and at the bottom portion thereof, said lugs being positioned to be received in spaced pairs of recesses in an oppositely positioned rail member at the other side of said chamber, said lugs having their bottom portions in the same horizontal plane, a hook member projecting from said end wall, said hook member being positioned medially between said lugs for reception within the recess in said rail member intermediate the recesses occupied by said spaced lugs and having a shank portion, the bottom of the shank portion being positioned above the bottom of the lug, the extremity of said hook depending downwardly below the bottoms of said supporting lugs to normally prevent longitudinal displacement of said head from its associated rail, said plate having a projecting portion above said hook defined by receding lateral walls, said projecting portions forming a fulcrum to facilitate the rocking movement of said head under load.

6. In a cargo brace assembly for the merchandising chamber of a carrier, a combination comprising rail members fixed along the opposite side walls of the carrier in a generally horizontal plane and formed with spaced longitudinally arranged recesses, the wall portions defining the bottom portions of the recesses lying generally in the same plane, the cargo brace including a medial beam structure having a longitudinally extending recess at one end, a fixed head member at one end of the beam structure formed with a hook for engaging a recess in a rail member at one side of the chamber, a slidable head member at the other end of the beam structure including a shank slidably received in said recess within the beam structure, said head members being provided at their bottom edge portions with a pair of outwardly projecting spaced supporting lugs for seating in spaced recesses in an adjacent rail member, said supporting lugs having their bottom edge portions adjacent the bottom edge of said plate and being vertically of elongate form, a hook member projecting from said head members intermediate the lugs, the hook members each including a shank and an outer downwardly projecting hook extremity, the shank of the hook member having its bottom surface spaced above the bottom surfaces of said projecting lugs with the hook projections depending below the bottom portions of said lugs, a projection forming a fulcrum extending from said head member above said hook, and a horizontally extending supporting projection extending from the upper margin of said head members above the hook member, said supporting projection extending outwardly beyond said hook and lugs.

7. In an attaching head for connecting a lading beam to its support, said attaching head including a vertical plate-like member positioned at the end of the beam, said plate-like member including an upper horizontal supporting projection extending therefrom, supporting lugs projecting outwardly from the bottom portion of said plate and at each side thereof, a hook member projecting from said plate intermediate of said supporting lugs, said hook member including a shank having its bottom edge above the bottom edge portion of said projecting supporting lugs and a nose portion depending below the bottom of said projecting supporting lugs, a projection extending from said plate between said hook and horizontal supporting projection at the top of the plate, the walls defining said projection receding laterally, whereby said projection forms a fulcrum point for rotational movement of said head, said horizontal supporting projection extending lengthwise of said beam and outwardly beyond said lugs and hook.

8. In a cargo brace assembly for the merchandising chamber of a carrier, a combination comprising rail members fixed along the opposite sides of the carrier in a generally horizontal plane and formed with spaced longitudinally arranged recesses of upright oval form, the walls defining the bottom portions of the recesses lying generally in the same plane, the cargo brace including a medial beam structure having a head at one end formed with a projection for engaging a recess in one of said rail members at one side of the chamber, a head member at the other end of the beam structure mounted for longitudinal sliding association with the beam structure, said head member including an upright outer wall, a pair of spaced supporting lugs projecting outwardly of said upright wall at the bottom portion thereof for engaging a spaced pair of recesses in the adjacent rail member, said lugs being vertically elongated and of less vertical height than the vertical dimension of said recesses, a hook member projecting from said upright wall, said hook member including a shank and an outer projecting hook extremity, the shank of the hook member having its bottom surface positioned above the bottom surface of the projecting lugs and its upper surface below the top surface defining the recess in which it may be located, the hook extremity of said hook member depending below the bottom portions of the lugs to prevent retraction from the recess in which it may be located, said hook member having its transverse dimension less than the transverse dimensions of said lugs, a projection formed on said upright wall above the hook member and vertically centrally of said lugs, said projection being defined by rearwardly receding walls to provide a fulcrum to permit movement of said head and beam due to lateral distortion of the beam under horizontal loading, and a horizontally extending support projecting from the upright wall above the fulcrum, said horizontal support extending substantially outward beyond the hook to form a support for the beam when the hook and lugs are retracted from engagement with their respective recesses.

9. In a cargo brace assembly for the merchandising chamber of a carrier, a combination comprising rail members fixed along the opposite sides of the carrier in a generally horizontal plane and formed with spaced longitudinally arranged recesses, the wall portions defining the bottom portions of the recesses lying generally in the same plane, the cargo brace including a medial beam structure having a head at one end formed with a projection for engaging a recess in one of said rail members at one side of the chamber, a head member at the other end of the beam structure mounted for longitudinal sliding association with the beam structure, said head member including an upright outer wall being offset laterally and upwardly from horizontal and vertical planes through the center of said medial beam structure, a pair of spaced supporting lugs projecting outwardly of said upright wall for engaging a spaced pair of recesses in the adjacent rail member, a hook member rigidly fixed to and projecting from the outer face of said upright wall, said hook member including a shank and an outer projecting hook extremity, said hook extremity projecting outwardly beyond said lugs and depending below the bottom portions of the lugs, said hook member having its transverse dimension less than the transverse dimensions of said lugs, a projection formed on said upright wall above the hook member, said projection being defined by rearwardly receding walls to define a fulcrum area to permit lateral distortion of the beam under horizontal loading, and a horizontally extending support projecting from the upright wall above the fulcrum area, said horizontal support extending substantially outward beyond the hook lugs to form a support for the beam when the hook and lugs are detracted from engagement with their respective recesses.

10. In a cargo brace assembly for the merchandising chamber of a carrier, a combination comprising rail members fixed along the opposite sides of the carrier in a generally horizontal plane and formed with spaced longitudinally arranged recesses, the walls defining the bottom portions of the recesses lying generally in the same plane, the cargo brace including a medial beam structure having a head at one end formed with a projection for engaging a recess in one of said rail members at one side of the chamber, a head member at the other end of the beam structure mounted for longitudinal sliding association with the beam structure, said head member including an upright outer wall, a pair of spaced supporting lugs projecting outwardly of said upright wall for engaging a spaced pair of recesses in the adjacent rail member, said lugs being of less vertical height than the vertical dimension of said recesses, a hook member projecting from said upright wall, said hook member including a shank and an outer projecting hook extremity, the shank of the hook member having its bottom surface positioned above the bottom surface of the projecting lugs and its upper surface below the top surface defining the recess in which it may be located, the hook extremity of said hook member depending below the bottom portions of the lugs to prevent retraction from the recess in which it may be located, said hook member having its transverse dimension less than the transverse dimensions of said lugs, a projection formed on said upright wall above the hook member, said projection being defined by rearwardly receding walls to provide a fulcrum to permit movement of said head and beam due to lateral distortion of the beam under horizontal loading, and a horizontally extending support projecting from the upright wall above the fulcrum, said horizontal support extending substantially outward beyond the hook to form a support for the beam when the hook and lugs are retracted from engagement with their respective recesses and normally being spaced above and out of contact with the top of the associated rail member when the beam is supported by said spaced lugs.

References Cited in the file of this patent

UNITED STATES PATENTS

| | | |
|---|---|---|
| 2,593,174 | O'Dell | Apr. 15, 1952 |
| 2,834,304 | Chapman et al. | May 13, 1958 |